Oct. 14, 1958 — G. E. I. VIDOVIC — 2,855,965
BREAD SLICER
Filed April 25, 1956 — 3 Sheets-Sheet 1
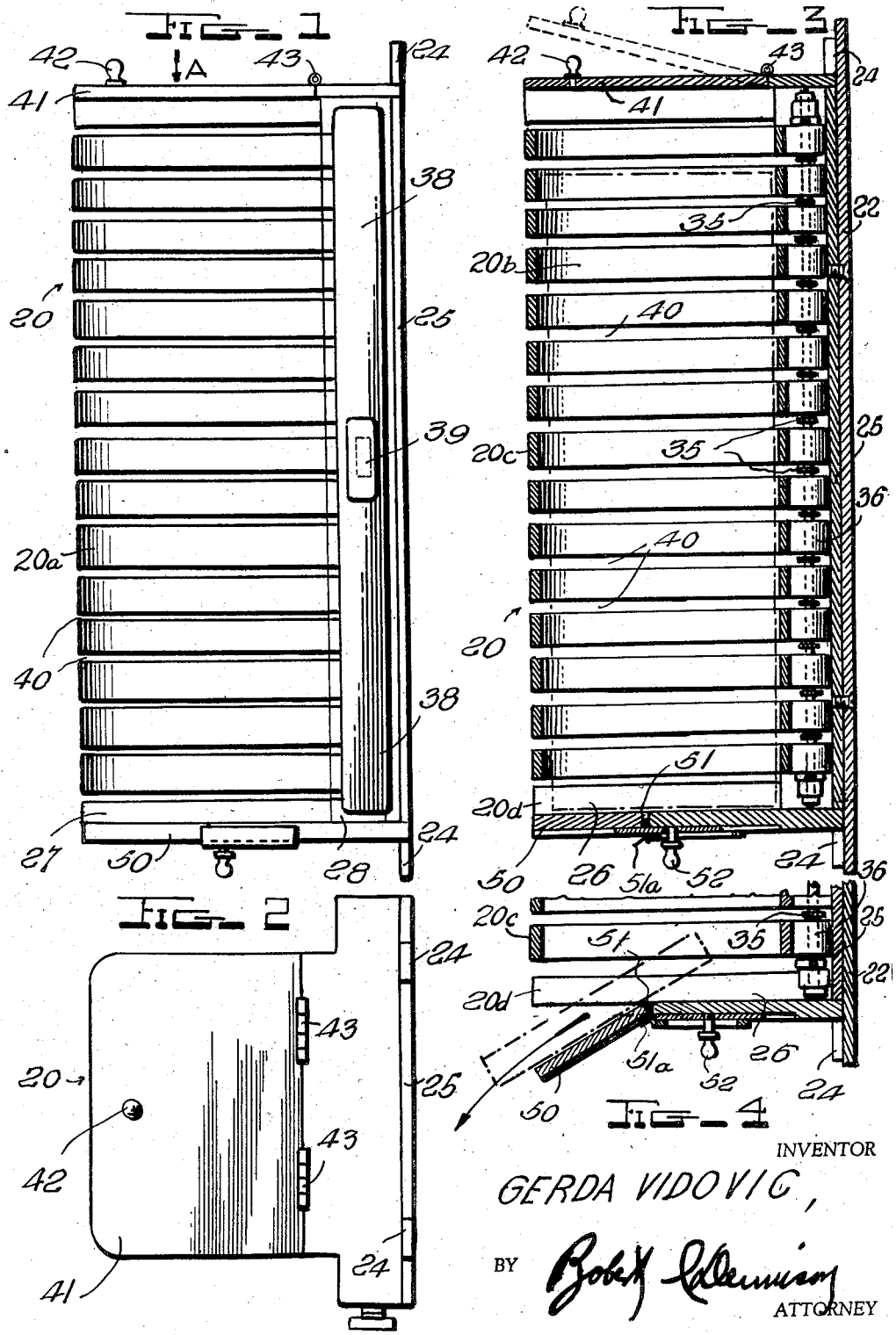
INVENTOR
GERDA VIDOVIC,
BY
ATTORNEY

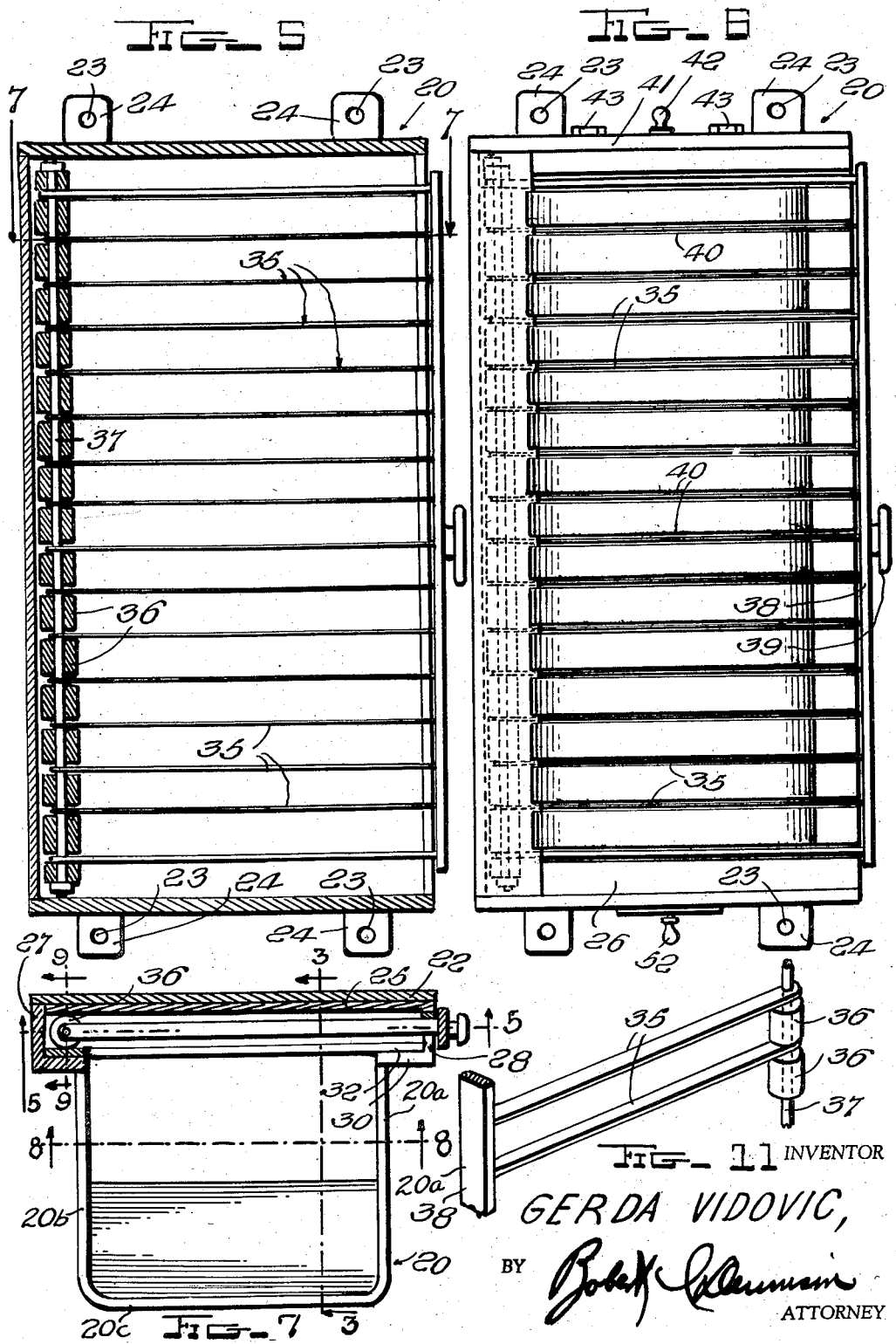

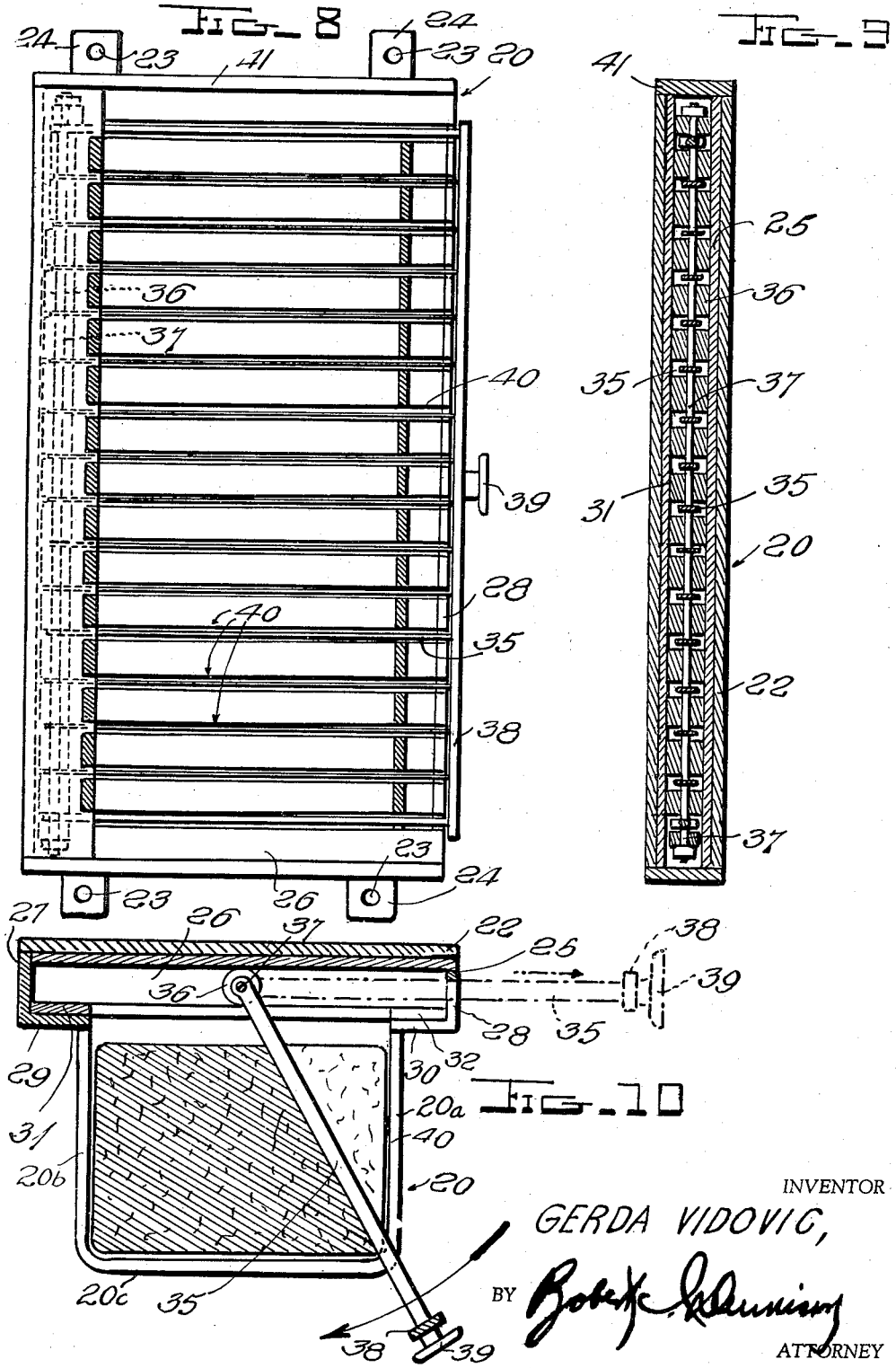

United States Patent Office 2,855,965
Patented Oct. 14, 1958

2,855,965

BREAD SLICER

Gerda Elsbeth Irma Vidovic, Kenora, Ontario, Canada

Application April 25, 1956, Serial No. 580,501

2 Claims. (Cl. 146—139)

This invention relates to a bread slicer or similar device adapted for the separation of a loaf of bread or cake into a plurality of slices, and has as its primary object the provision of a multi-bladed apparatus, whereby such slicing may be effected in a single operation for the entire loaf.

A further object of the invention is the provision of such a device wherein the slices are of uniform thickness.

Still another object of the invention is the provision of such a device which provides a vertically positioned receptacle for the retention of the bread or cake provided with means whereby individual slices may be individually dispensed with a minimum of effort and difficulty.

A further object is the provision of a slicing device, adapted normally to be retained within the base of the device and comprised of a plurality of simultaneously rotatable cutting blades, operable in spaced slots in an outer casing, to sever simultaneously a loaf of bread or cake or the like into a plurality of equally sized bread slices.

A further object of this invention is the provision of an hinged upper closure for the device which may be opened fully to permit the introduction of a whole unsliced loaf of bread for slicing.

Still another object of this invention is the provision of a lower gate of half size whereby an individual slice may be withdrawn on each movement of the lower door.

A still further object of the invention is the provision of an outer casing adapted for vertical mounting on a wall or the like provided with a plurality of horizontal equidistantly spaced guide slots extending along the front and side walls thereof, to provide guide slots for swivelably mounted knives connected to a roller axle slidably mounted in a compartment to the rear or under the base of the device.

Still other objects reside in a bread slicer of the character described which is sturdy and durable in construction, reliable and efficient in operation and relatively simple and inexpensive.

Other objects will in part be obvious and in part be shown in the accompanying drawing wherein there is shown a preferred embodiment of this invention and wherein—

Fig. 1 is a side elevational view of a form of the device shown as affixed to a vertical surface such as a wall or the like.

Fig. 2 is a top plan view of the device of Fig. 1.

Fig. 3 is a vertical sectional view taken substantially along the line 3—3 of Fig. 7, as viewed in the direction indicated by the arrows.

Fig. 4 is a fragmentary section of the lower part of Fig. 3 and similar thereto, showing the lower gate in open position to discharge a slice of bread.

Fig. 5 is a vertical sectional view taken substantially along the line 5—5 of Fig. 7 as viewed in the direction indicated by the arrows.

Fig. 6 is a front elevational view of the device, certain concealed elements being shown in dotted lines.

Fig. 7 is a transverse sectional view, taken substantially along the line 7—7 of Fig. 5 as viewed in the direction indicated by the arrows.

Fig. 8 is a section taken substantially along the line 8—8 of Fig. 5 as viewed in the direction indicated by the arrows.

Fig. 9 is a vertical section taken substantially along the line 9—9 of Fig. 7, as viewed in the direction indicated by the arrows.

Fig. 10 is a view similar to Fig. 7 but showing the knives and their associated rollers moved laterally to a substantially central position of the slots whereby they may be swung horizontally about the longitudinal axis of a central support axle to pass transversely through the bread and slice the same, and Fig. 11 is a fragmentary perspective view of a constructural detail comprising a portion of the knife assembly.

Similar reference characters refer to similar parts throughout the several views of the drawings.

Having reference now to the drawings in detail, there is generally indicated at 20 an elongated housing or casing adapted to be mounted in vertical position on a wall or cabinet door or similar support 22, in any suitable manner, as by means of screws or the like (not shown) extending through suitable apertures 23 in suitable vertically extending lugs 24.

The casing 20 includes a substantially T-shaped cross section, see Figures 2, 4 and 10, for example, including a rear wall 25 securable in juxtaposition on the support 22, the wall 25 including at opposite edges in normal relationship to the general plane thereof parallel side walls 27 and 28. The side walls 27 and 28 continue in co-planar edge flanges 29 and 30, respectively, which are in parallel relationship to the wall 25. The flanges 29 and 30 overlie opposite side edges of a transverse panel 31 which is in parallel spaced relationship to the wall 25. The wall 25, panel 31 and side walls 27 and 28 combine to form a knife blade assembly storage compartment 26, as seen, for example, in Figure 10. The casing 20 includes sides 20a and 20b extending in parallel relationship from inner edges of the co-planar flanges 29 and 30 and are formed integrally with an end wall 20c. The end wall includes at the lower end thereof a transverse slot 20d, facilitating the removal of individual slices of bread or the like.

Normally positioned within compartment 26 are a plurality of knife blades 35 equidistantly spaced and separated by rollers 36 mounted on a common axle 37 at their rear ends and connected to a transverse bar 38 at their forward ends. Bar 38 is provided with a handle 39. Blades 35 are adapted, in a manner more fully described hereinafter, to be extended through a plurality of slots 40 in casing 20 to slice the bread contained therein. The slots 40 open through co-planar communicating slot portions in the panel 31, as indicated at 32 in Figure 10, and portions of the side wall 28 and flange 30. The side wall 28 includes a longitudinal slot permitting lateral withdrawal of the knife blade assembly in the manner shown by the phantom lines in Figure 10, and from this phantom line position, the knife blade assembly may be pivoted about the longitudinal axis of the axle 37 passing through the communicating slots.

When the device is mounted vertically, as is preferable, the open top is provided with a lid 41, having a handle 42, the lid 41 being pivoted as at 43 (see Figs. 1 to 3) to permit the insertion of a whole loaf of bread or the like, while the bottom of the device is provided with a half gate 50 pivoted as at 51 having a stop 51a and provided with a handle 52, which facilitates the withdrawal of a single slice at a time.

From the foregoing the operation of the device should now be readily understandable. A loaf of bread is inserted through the lid 41, after the device has been vertically mounted, and by means of the handle 39 the knife blades 35 are extended to the dotted line position of Fig. 10. They are then rotated about axle 37 and, guided by slots 40, serve to slice the loaf of bread, or the like, in an even uniform manner. The bread may then be dispensed in single slices through the slot 20d past the bottom half gate 50 as best shown in Fig. 4 in dotted lines.

From the foregoing it will now be seen that there is herein provided a bread slicer which accomplishes all of the objects of this invention and many others including many advantages of great practical utility and commercial importance.

As many embodiments may be made of this inventive concept and as many modifications may be made of the embodiment herein shown and described, it is to be understood that all matter herein is to be interpreted merely as illustrative and not in a limiting sense.

What I claim is:

1. A slicing apparatus for loaves of food products or the like comprising an elongated housing including means for vertically mounting the same on a vertical support surface, said housing including portions forming a knife blade storage compartment opening into one side of the housing, a plurality of horizontally extending and vertically spaced slots extending through the housing and in communication with the compartment, a knife blade assembly including a plurality of vertically spaced blades aligned with the slot portions, and a support axle extending the length of said compartment upon which said blades are mounted, roller elements on said axle between adjacent blades, said compartment including track means retaining said elements in said compartment whereby the knife assembly is mounted in the compartment, roller elements and track means cooperating to provide for lateral movement of the blades out of the compartment and supporting said blades for horizontal movement about the longitudinal axis of said axle permitting said blades to move transversely through the slots in the housing.

2. In slicing apparatus as set forth in claim 1 wherein said housing includes a vertically pivoted displaceable bottom portion permitting individual slices of a sliced loaf of bread or the like to be withdrawn therefrom, and displaceable cover means for permitting a loaf of bread or the like to be inserted vertically into said casing.

References Cited in the file of this patent

UNITED STATES PATENTS

| 1,753,371 | Georgopoulos | Apr. 8, 1930 |

FOREIGN PATENTS

| 144,182 | Germany | Sept. 11, 1903 |
| 603,477 | Great Britain | June 16, 1948 |